Aug. 27, 1935.  W. P. CHANDLER, JR  2,012,442
METHOD AND APPARATUS FOR EFFECTING A GAS AND LIQUID CONTACT
Filed Aug. 12, 1933  3 Sheets-Sheet 1

INVENTOR

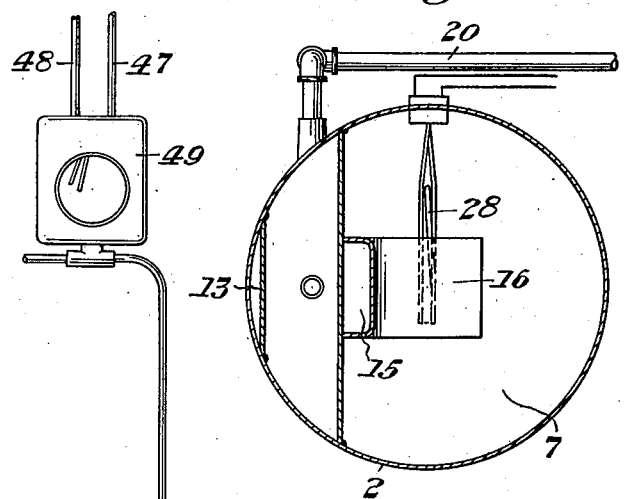
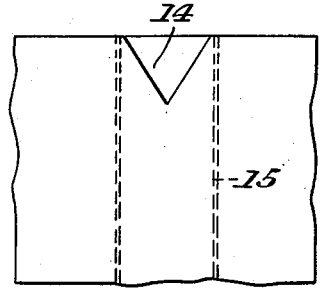
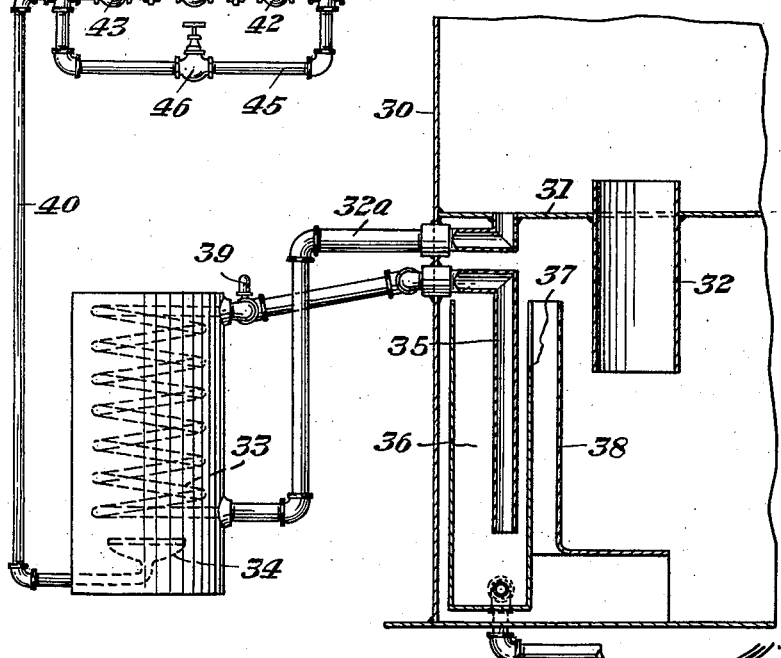

Patented Aug. 27, 1935

2,012,442

UNITED STATES PATENT OFFICE 2,012,442

METHOD AND APPARATUS FOR EFFECTING A GAS AND LIQUID CONTACT

Willard P. Chandler, Jr., Pittsburgh, Pa., assignor to Blaw-Knox Company, Pittsburgh, Pa., a corporation of New Jersey Application August 12, 1933, Serial No. 684,864

16 Claims. (Cl. 261—15)

This invention pertains generally to an apparatus for bringing gases and liquids into intimate contact, and applies particularly to the humidification of gases.

There are many industries in which it is desirable to regulate the humidity or amount of moisture contained in gas. In the case of atmospheric air, the humidity is regulated for the purpose of making the air comfortable and suitable for respiration or for maintenance of satisfactory conditions in certain industrial operations. In the case of gas to be used for combustion purpose transmitted through pipe lines, it is desirable to regulate the humidity so that the gas in passing through valves and meters and past pipe joints will not dry out the packing and cause leakages or a disarrangement of the pipe lines, valves, or other apparatus. The present invention may be used for the regulation of the humidity of any gas for any purpose, but for the purposes of the present specification and as showing a practical application of the invention it will be described as adapted for use on pipe lines for natural or other fuel gas.

In transmitting gas through pipes for a distance estimated to be long, that is to say, measured by miles or many miles, it is customary to have the gas transmitted through a long pipe at a relatively high pressure and to reduce the pressure before the gas is introduced into the distribution system for use. If the gas be originally saturated with moisture at high pressure, and the pressure be reduced by allowing the gas to expand, the expansion of the gas will result in a reduction of its temperature, but when the temperature is restored to the normal temperature of the distributing pipe the resulting relative humidity will be greatly reduced, and it is desirable to add moisture to the gas after its pressure has been reduced. It will be understood that this is just one instance or illustration where it is desirable to supply humidity to the gas and that there may be other conditions under which it is desirable to increase the humidity of the gas whether it has undergone a reduction in pressure or not.

In a gas fuel distributing system of the type above referred to, the pipes which deliver the gas to the consumers are usually located in the earth and the pipes which deliver the gas to the humidifier are usually underground. In a gas distributing system the gas pipes are usually in the ground. If the temperature of the gas is too high after it has been humidified, the gas is cooled in passing through the distributing system and excess moisture is precipitated, and this condition should be avoided.

If, on the other hand, the gas is not sufficiently humidified, it will evaporate moisture from valve packings and from other apparatus in the distributing line, as pointed out above. Heretofore various provisions have been made for humidifying the gas, making use of a number of wet and dry bulb thermometers, which apparatus is relatively delicate and difficult to maintain.

According to the present invention, a substantially constant and desired degree of humidity is maintained by a method and arrangement which is much more simple and convenient than apparatus heretofore provided for such purpose.

In carrying out the invention, provision is made for maintaining in contact with the gas a large surplus of fluid beyond that required for evaporation alone. By this means complete humidification is insured regardless of irregularities in the flow. It is also a well-known fact that the evaporation of fluid requires the absorption of heat. This heat is abstracted from the gases themselves provided that no other source of heat is available.

According to the present invention, provision is made for supplying heat to the water and for so regulating the heat as to insure that both the temperature and the humidity of the gas leaving the apparatus are as desired.

The invention may be understood by reference to the accompanying drawings, which illustrate particular embodiments of my invention, and it will be understood that these are merely illustrative and that the invention is not confined to the particular construction and arrangement of the apparatus therein disclosed.

In the drawings:

Figure 2 is a transverse horizontal section in the plane of line II—II of Fig. 1;

Figure 3 is a detail view representing a section in the plane of line III—III of Fig. 1 and showing the particular construction of the weir;

Figure 4 is an assembly view similar to Fig. 1, only part of the apparatus, however, being shown, and wherein a different arrangement is provided for heating the water.

Figure 1:
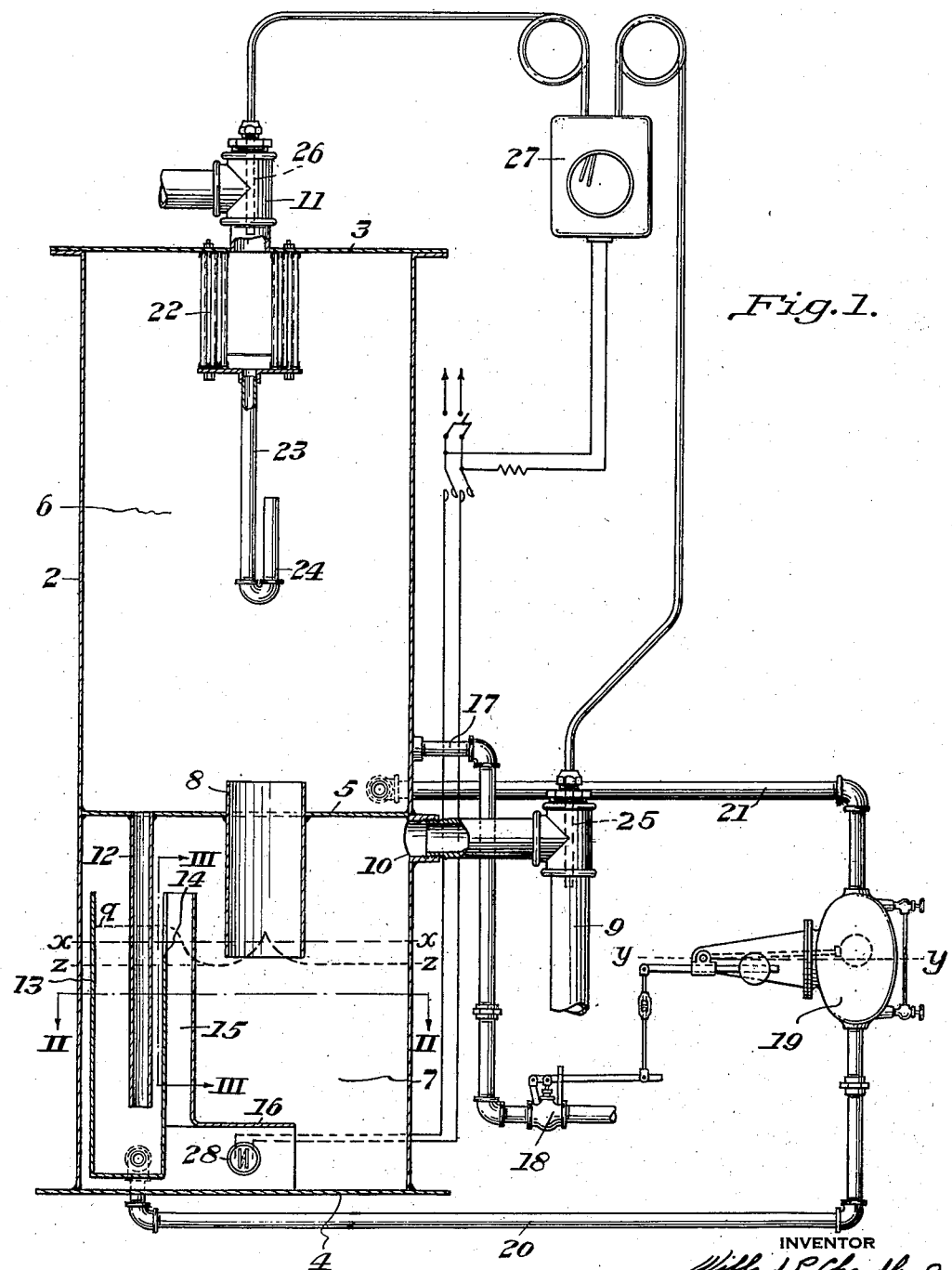
Figure 1 shows a transverse vertical section through a humidifying apparatus constructed in accordance with my invention, certain parts of the apparatus being shown in elevation.

In the drawings, 2 designates a closed shell having a top 3 and a bottom 4 and having a partition 5 extending thereacross intermediate its ends, this partition dividing the interior of the shell into an upper chamber 6 and a lower chamber 7. Passing through the partition 5 is a vertically extending pipe or conduit 8, the top of which extends a short distance above the partition 5, and the lower edge of which is positioned some distance below the partition 5. The gas to be humidified is supplied through a pipe 9 which opens into the chamber 7 at 10 at a point below the partition 5. The pipe 11 leads from the top of the casing, and through this pipe the gas which has been humidified is carried away.

In the operation of this particular form of contact device, water or other fluid to be evaporated is kept in the lower chamber 7 so that normally the level of the water is approximately as indicated by the dotted line X—X in Figure 1. The gas in the upper part of the chamber 7 exerts a pressure on the water, and sweeps under the lower edge of the conduit 8, passing up into the chamber 6. As it does so, it tends to form a cone of water inside the duct 8, and to absorb some of the water and break some of the water up into a fine spray which is carried up through the duct, some of it being absorbed by the air and some of it precipitating and collecting on the top of the web 5. This particular arrangement for bringing gas and liquid into intimate contact is disclosed in the copending application of Donald A. Sillers, Serial No. 587,684, filed January 20, 1932, and this apparatus per se does not constitute my invention.

According to the present invention, there is provided in the partition 5 at one side of the duct 8 a downwardly projecting pipe 12 which extends down into a receptacle or compartment 13 inside the chamber 7. A portion of the wall of this compartment or receptacle is notched out or cut away, as indicated at 14 (see Fig. 3), to form a weir through which water may overflow from the compartment 13 into the chamber 7. Instead of discharging the water from the weir directly into the compartment or chamber 7, there is provided a closed duct 15 which leads to a point adjacent the bottom of the chamber 7 and which has a horizontal portion or extension 16 so that the water flowing over the weir moves down the passageway 15 and along the passageway 16, discharging into the compartment 7 adjacent the bottom of said compartment.

The water supply pipe is indicated at 17, this pipe opening into the chamber 6 above the partition 5. In the supply pipe 17 is a flow control valve 18, this valve being a float operated valve. The float for controlling the valve 18 is contained in a float chamber 19. Leading from the bottom of this chamber is a pipe 20 which opens into the bottom of the receptacle or compartment 13. Leading from the top of the float chamber 19 is a pipe 21 which opens into the chamber 6 above the partition 5.

The operation of these regulatory parts is as follows: Let us suppose that the gas supply has been shut off after operating and that the water in the system has found its level, indicated by the broken line XX in Figure 1, which is a little above the bottom edge of the pipe 8, the bottom of the weir 14.

When the gas is turned on it will depress the level of the liquid in 13 so as to admit gas at the bottom of the pipe 8. Liquid will be carried up with the gas through the pipe 8, collect on the upper side of the partition 5 and flow down through the pipe 12 into the weir chamber and overflow at the weir 14. Evaporation of liquid will occur until at any constant flow of gas equilibrium is established with the level at $yy$ in the regulating device 19. Thereafter, when the level in 19 falls below $yy$, the valve 18 will be opened and kept open until the level $yy$ is restored. Thus the level at $yy$ will be maintained substantially constant, water being supplied to replace that lost by evaporation. With a given gas flow, the level in 13 may be represented by $zz$, and the level above the weir by "$q$". The level $yy$ does not coincide with the level $zz$ nor with the level "$q$", but is higher than $zz$ by a hydraulic head equal to the difference between the gas pressure below 5 and that above 5. In practice the device 19 is set at such elevation as to bring the level $yy$ at the desired elevation above $zz$ under normal working conditions, and the apparatus may be made readily adjustable, if desired, by making the pipes 20 and 21 flexible. Raising 19 with relation to 14 will increase the amount of liquid taken by a given gas flow, and lowering 19 will diminish the amount of liquid by a given gas flow, within reasonable limits for which the apparatus is designed.

If, during operation, the gas flow increases, the pressure lost by the gas in passing through the tube 8 increases as does the head over the weir owing to the greater amount of liquid carried over. This raises the level $yy$, and prevents the admission of liquid through the valve 18 until sufficient liquid has been evaporated from 13 to re-establish a new equilibrium adapted to the larger gas flow. On the other hand, when the flow of gas diminishes, the level $yy$ is lowered, opening the valve 18 and supplying additional liquid through 17 until the level $yy$ in 19 is re-established.

In the top of the chamber 6 around the discharge passage leading to the pipe 11 there is a separator 22 which is designed to remove droplets of water that may be carried with the gas toward the outlet pipe. Separators of this type are well-known in the art and form no part of the present invention. The water which collects on this separator flows down the pipe 23 having a trap 24 at its lower end, the water discharging through the open leg of the trap and falling back onto the partition 5. The purpose of the pipe 23 and the trap 24 is to collect the water which is separated out of the gas and returned into the water circulating system, but by reason of the trap the gas cannot pass directly up the pipe 23 into the outlet pipe 11, so that all of the gas has to pass through the separator.

Since the evaporation of water requires heat, the temperature of the gas would be lowered in the humidifying unit unless heat would be added with the water in sufficient amount to maintain the desired temperature or to produce the desired temperature at the outlet. For this reason a thermostatic apparatus is provided comprising a thermometer or thermostat 25 positioned in the gas inlet passage 9 and a similar thermometer or thermostat 26 is provided in the outlet passage 11. These thermostats are arranged to operate electrical contacts in a controller 27, the controller being of a well-known construction and being conventionally illustrated. This controller regulates the flow of electric current to an electric heating unit 28 in the passage 16, the arrangement being such that a relative lowering of the temperature at 11 will turn on the electric heater and the relative increase in temperature at 11 will turn off the heater or reduce the current passing through it. Likewise, a relative increase in the temperature of the gas in the passage 9 will turn on or increase the supply of heat, and a relative lowering will turn off or reduce the flow of current through the heating unit 28.

By reason of this arrangement the water discharging from the weir flows over the heating unit 28, and heat in a necessary amount is supplied to the water so as to compensate for the absorption of heat through the process of evaporation and thus maintain the temperature of the gas leaving the unit about the same as the temperature of the gas entering the unit or at a definite predetermined temperature with respect to the incoming gas. For instance, in a gas distributing system the pipe 11 goes back into the ground and if the temperature of the gas were too high or the amount of heat supplied to the humidifier were too great, an excess amount of moisture would be condensed in the pipes of the gas distributing system. Since the gas is supplied to the humidifier ordinarily through a pipe emerging from the ground, the desirability of maintaining the proper relation of the temperature of the incoming gas to the outgoing gas to avoid unnecessary condensation of moisture is apparent.

In Fig. 4 I have illustrated an arrangement generally similar to that disclosed in Fig. 1, with the exception that instead of using an electric heater a gas heater is employed and the thermostats control the volume of gas admitted to the burner of the water heater instead of controlling the flow of electric energy to an electric heater. In this view the humidifying unit, designated generally as 30, is of a construction similar to that previously described, there being a horizontal partition 31 corresponding to the partition 5 of Fig. 1, having a conduit or duct 32 therethrough.

Instead of the water being discharged directly from the partition 31 into the weir, a pipe 32a is provided through which the water may flow from the partition 31 down to a circulating coil 33 under which is a gas burner 34. The top of the circulating coil communicates with a pipe 35 which discharges into a weir or receptacle 36, the overflow for the weir being designated 37. At 38 there is a baffle similar to that described in Fig. 1, so that the water overflowing from the weir has to flow down to the bottom of the humidifier and before mingling with the mass of water in the humidifier. In the pipe 35, at 39, I have shown an air relief valve of any known or preferred type, by means of which any trapped air can be drained out of the water heater.

The burner 34 is supplied with gas through a pipe 40 from a gas supply pipe 41. In the pipe 41 I have shown hand valves 42 and 43 between which is an automatic valve 44. There is a by-pass 45 having a valve 46 therein by means of which the valves 42, 43 and 44 can be by-passed when it is so desired. At 47 I have indicated a portion of a thermostat corresponding to the thermostat 25, and at 48 I have indicated a portion of a thermostat corresponding to the thermostat 26, the complete arrangement being a duplicate of that shown in Fig. 1 and therefore not being completely shown in Fig. 4. These thermostats operate on a controller unit 49 of a known construction, which controller regulates the source of fluid pressure to a fluid pressure responsive valve operating means 50 of a known or preferred construction,
the valve operating means 50 being connected to the valve 44. Relative changes in temperature effect the controller 49 to operate the mechanism 50 to increase or diminish the flow of gas through the valve 44 and thus control the amount of heat supplied to the water. The by-pass 45 is provided merely as an auxiliary control and for the purpose of permitting manual operation in the event of a failure of the thermostatic device.

In Fig. 4 I have not shown the water supply line, but it will be understood that any suitable means for controlling the flow of water to the humidifier may be used, as for example, the arrangement shown in Fig. 1.

Figure 5:
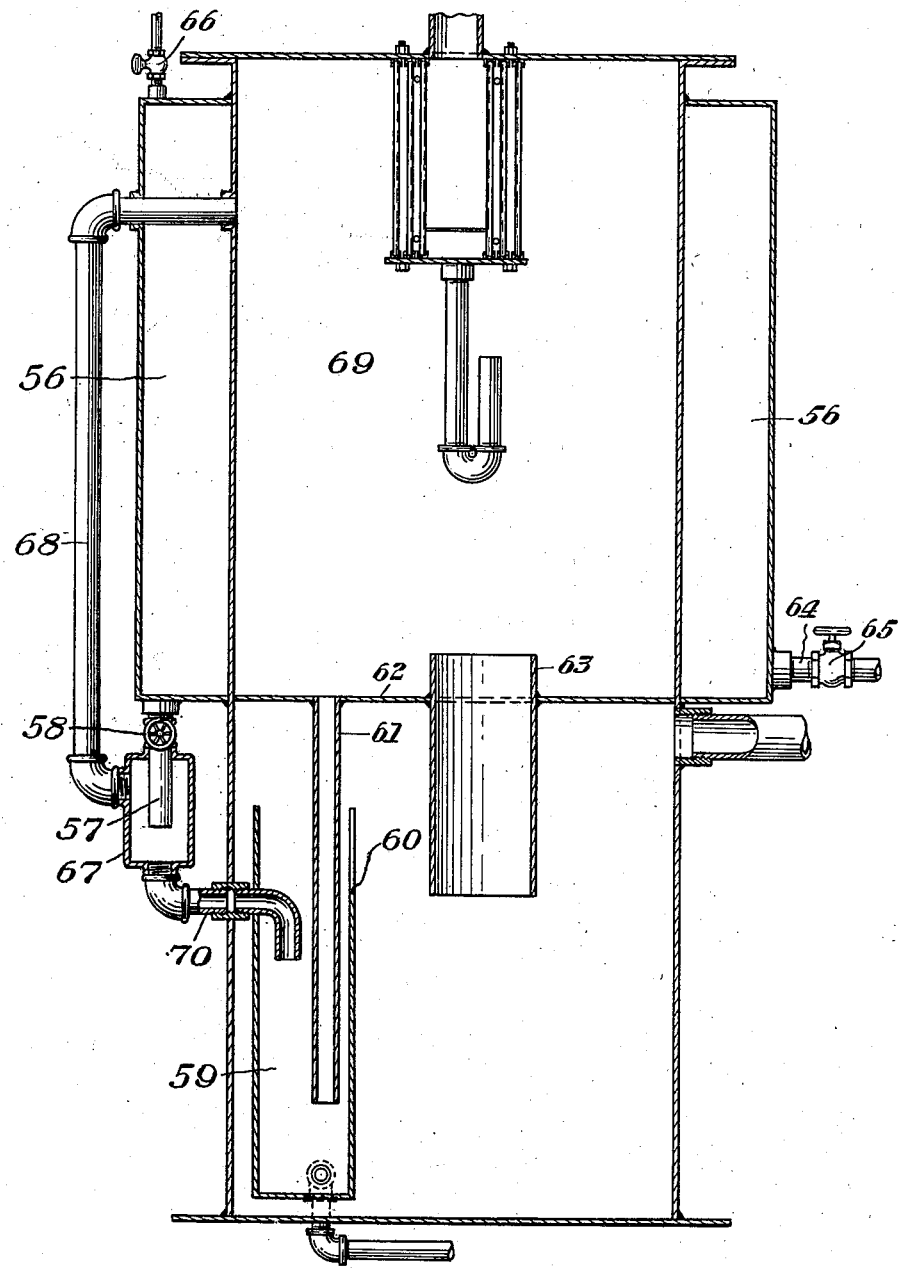
Figure 5 is a view similar to Fig. 1 illustrating a different arrangement for controlling the water supply in the humidifier.

In Figure 5 I have illustrated another arrangement for maintaining the circulation of water over the weir and which does not require the use of a float valve. This is illustrated merely to show that various arrangements for maintaining the circulation of water over the weir are contemplated.

In this arrangement the humidifier is similar to the one described in connection with Fig. 1 and is designated generally by the reference numeral 55. Surrounding the upper part of the humidifier is a reservoir 56. Leading from the bottom of this reservoir is a pipe 57 having a valve 58 therein, which pipe extends down into a chamber 67. Said chamber 67 is connected by the gas pressure equalizing pipe 68 to the chamber 69 above the partition 62, and is provided at the bottom with a pipe 70 which pipe extends down into the compartment and weir described in Fig. 1. The lower end of pipe 57 terminates above the overflow of the weir 60. At 61 is the pipe leading down from the partition 62 into the weir chamber, and 63 designates the conduit through the partition 62.

The reservoir 56 is provided with a water supply pipe 64 with a control valve 65 therein. At 66 there is indicated a simple form of valve by means of which air can be released from the reservoir when water is being supplied to the pipe 64. Assuming the system to be full of water, the operation of humidification sets up the circulation of water. As soon as the lowermost end of the pipe 57 is uncovered, water will discharge therefrom to maintain the flow of water over the weir, but as the end of the pipe is covered so that air cannot flow back into the reservoir, the further flow of water ceases. By reason of this arrangement the flow of water over the weir can be maintained so long as water is kept in the reservoir 56. The reservoir 56 is shown as surrounding the humidifying unit merely as showing a convenient arrangement for the reservoir. Obviously, moreover, other arrangements for controlling the flow of water than the ones herein specifically illustrated may be used.

The invention provides a novel method for effecting humidification under all operating conditions in a simple manner and without the use of complicated or delicate instruments as have heretofore been necessary.

According to this method a substantially constant depth of water is maintained in the lower part of the humidifier, with the result that at a given gas pressure all of the gas is humidified to the same extent. Heat is supplied to the water in varying amounts, depending on relative variations in the temperature of the incoming and outflowing gas, so that the humidity will be automatically regulated in respect to the variations in temperature of the incoming and outgoing gases.

Other advantages of the invention reside in the apparatus and in the provision of the weir through which the circulation of the water is effected and the supplying of additional water to maintain a constant or substantially constant flow of water over the weir at a given rate of gas flow.

As hereinbefore stated, while I have shown certain specific constructions and arrangements of various apparatus, this is by way of illustration of my invention and various changes and modifications may be made therein within the contemplation of my invention.

I claim:

1. The method of humidifying a gas which comprises bringing the gas into contact with a body of a liquid and causing the gas to effect a circulation of the liquid, and varying the depth of the liquid in the body inversely with variation in the gas pressure.

2. The method of humidifying a gas which comprises bringing the gas into contact with a body of liquid and causing the gas to effect a circulation of the liquid, varying the depth of liquid in the body inversely with variations in pressure whereby a decrease in pressure raises the liquid level and assures an excess of liquid being present for contact with the gas at the lower pressure, and variably supplying heat to the liquid inversely with variations in the relative temperature of the humidified gas with respect to the temperature of the gas to be humidified.

3. A gas humidifying apparatus comprising a gas and liquid contact unit having a gas inlet passage, a gas outlet passage, means for supplying heat to the unit, and means for controlling the heat supplying means to supply only sufficient heat to maintain a predetermined relationship between the temperature of the gas in the outlet and the temperature of the gas in the inlet.

4. A gas humidifying apparatus comprising a gas and liquid contact unit having a gas inlet passage, a gas outlet passage, means for supplying heat to the unit, and means for controlling the heat supplying means to supply only sufficient heat to maintain a predetermined relationship between the temperature of the gas in the outlet with respect to the temperature of the gas in the inlet, said means including a thermostat coupled with the outlet and a thermostat coupled with the inlet and a common control unit responsive to said thermostats.

5. A gas humidifying apparatus comprising a gas and liquid contact unit having a gas inlet passage and a gas outlet passage, means for supplying heat to the liquid in the apparatus, a thermostat in the gas inlet passage, a thermostat in the gas outlet passage, and a control element for controlling said heat supplying means responsive to said thermostats.

6. A gas humidifying apparatus comprising a gas and liquid contact unit of the type wherein the gas establishes a circulation of liquid through the unit and having a gas inlet passage and a gas outlet passage, means for supplying heat to the circulating liquid, and means for controlling the said heating means for increasing the amount of heat supplied to the liquid when the temperature of the gas in the outlet falls below a predetermined relation to the temperature of the gas in the inlet and for causing the heating means to supply less heat when the temperature of the gas in the outlet exceeds a predetermined relation to the temperature of the gas in the inlet.

7. A gas humidifying apparatus comprising a gas and liquid contact unit of the type wherein the gas establishes a circulation of liquid through the unit and having a gas inlet passage and a gas outlet passage, means for supplying heat to the circulating liquid, and means for controlling the said heating means for increasing the amount of heat supplied to the liquid when the temperature of the gas in the outlet falls below a predetermined relation to the temperature of the gas in the inlet and for causing the heating means to supply less heat when the temperature of the gas in the outlet exceeds a predetermined relation to the temperature of the gas in the inlet, said means comprising a thermometer in the gas inlet, a thermometer in the gas outlet, and a common control unit responsive to said thermometers, said control unit being operatively connected with the heating means.

8. A gas humidifying apparatus comprising a chamber having a transverse horizontal partition dividing the chamber into an upper compartment and a lower compartment, a conduit opening through the partition and projecting into the lower compartment, a well in the lower compartment, a second conduit for conveying a liquid from the top of said partition into the well, said well having an overflow weir into the lower compartment, means for supplying gas to the lower compartment, and means for withdrawing humidified gas from the upper compartment.

9. A gas humidifying apparatus comprising a chamber having a transverse horizontal partition dividing the chamber into an upper compartment and a lower compartment, a conduit opening through the partition and projecting into the lower compartment, a well in the lower compartment, a second conduit for conveying a liquid from the top of said partition into the well, said well having an overflow weir into the lower compartment, means for supplying gas to the lower compartment, means for withdrawing humidified gas from the upper compartment, and means for regulating the depth of liquid in the lower compartment according to the rate of gas flow.

10. A gas humidifying apparatus comprising an enclosed chamber having a transverse substantially horizontal positioned partition intermediate its upper and lower ends dividing the chamber into upper and lower compartments, a conduit passing through the partition projecting down into the lower compartment and having its upper end slightly above the top plane of the partition, a receptacle having an overflow opening into the lower compartment, a return pipe leading from said partition into said receptacle, and means for supplying liquid to the apparatus proportionately to the rate at which the liquid is being evaporated.

11. A gas humidifying apparatus comprising a chamber having a horizontally extending partition dividing the chamber into upper and lower compartments, a weir in the lower compartment overflowing into said compartment, a pipe leading from said partition into said weir, a well through said partition extending down into the lower compartment, a gas inlet passage to the lower compartment, a gas outlet passage leading from the upper compartment, and means responsive to the depth of liquid in the weir for supplying liquid to the apparatus.

12. A gas humidifying apparatus comprising a chamber having a horizontally extending partition dividing the chamber into upper and lower compartments, a weir in the lower compartment overflowing into said compartment, a pipe leading from said partition into said weir, a well through said portion extending down into the lower compartment, a gas inlet passage to the lower compartment, a gas outlet passage leading from the upper compartment, means responsive to the depth of liquid in the weir for supplying liquid to the apparatus, and a baffle outside of the weir for directing the liquid from the weir into the lower part of the compartment.

13. A gas humidifying apparatus comprising a chamber having a horizontally extending partition dividing the chamber into upper and lower compartments, a weir in the lower compartment overflowing into said compartment, a pipe leading from said partition into said weir, a well through said partition extending down into the lower compartment, a gas inlet passage to the lower compartment, a gas outlet passage leading from the upper compartment, means responsive to the depth of liquid in the weir for supplying liquid to the apparatus, a baffle outside of the weir for directing the liquid from the weir into the lower part of the compartment, said baffle forming in effect a passageway, and a heating means in the passageway.

14. A gas humidifying apparatus comprising an enclosed chamber having a horizontally extending partition therein dividing the chamber into upper and lower compartments, means passing through the partition forming a well projecting into the lower compartment, said means terminating above the bottom of the lower compartment, a weir for supplying liquid to the lower compartment, a return pipe leading from the partition to the weir, means responsive to the depth of liquid in the weir for controlling the supply of additional liquid to the apparatus, and means for supplying gas to the lower compartment and a gas outlet in the upper compartment.

15. A gas humidifying apparatus comprising an enclosed chamber having a horizontally extending partition therein dividing the chamber into upper and lower compartments, means passing through the partition forming a well projecting into the lower compartment, said means terminating above the bottom of the lower compartment, a weir for supplying liquid to the lower compartment, a return pipe leading from the partition to the weir, means responsive to the depth of liquid in the weir for controlling the supply of additional liquid to the apparatus, means for supplying gas to the lower compartment and a gas outlet in the upper compartment, means for heating the liquid, and means for varying the amount of heat supplied according to the relation of the temperature of the gas in the outlet as compared with the temperature of the gas in the inlet.

16. A gas humidifying apparatus comprising an enclosed chamber having a horizontally extending partition therein dividing the chamber into upper and lower compartments, means passing through the partition forming a well projecting into the lower compartment, said means terminating above the bottom of the lower compartment, a weir for supplying liquid to the lower compartment, a return pipe leading from the partition to the weir, means responsive to the depth of liquid in the weir for controlling the supply of additional liquid to the apparatus, means for supplying gas to the lower compartment and a gas outlet in the upper compartment, means for heating the liquid, means for varying the amount of heat supplied according to the relation of the temperature of the gas in the outlet as compared with the temperature of the gas in the inlet, said means comprising a thermostat in each of said passages, and a common control for the heating means responsive to said thermostats.

WILLARD P. CHANDLER, Jr.

CERTIFICATE OF CORRECTION.

Patent No. 2,012,442.  August 27, 1935.

WILLARD P. CHANDLER, JR.

It is hereby certified that error appears in the printed specification of the above numbered patent requiring correction as follows: Page 5, first column, line 5, claim 1, for "portion" read partition; and that the said Letters Patent should be read with this correction therein that the same may conform to the record of the case in the Patent Office.

Signed and sealed this 24th day of September, A. D. 1935.

(Seal)

Leslie Frazer
Acting Commissioner of Patents